Patented Oct. 21, 1947

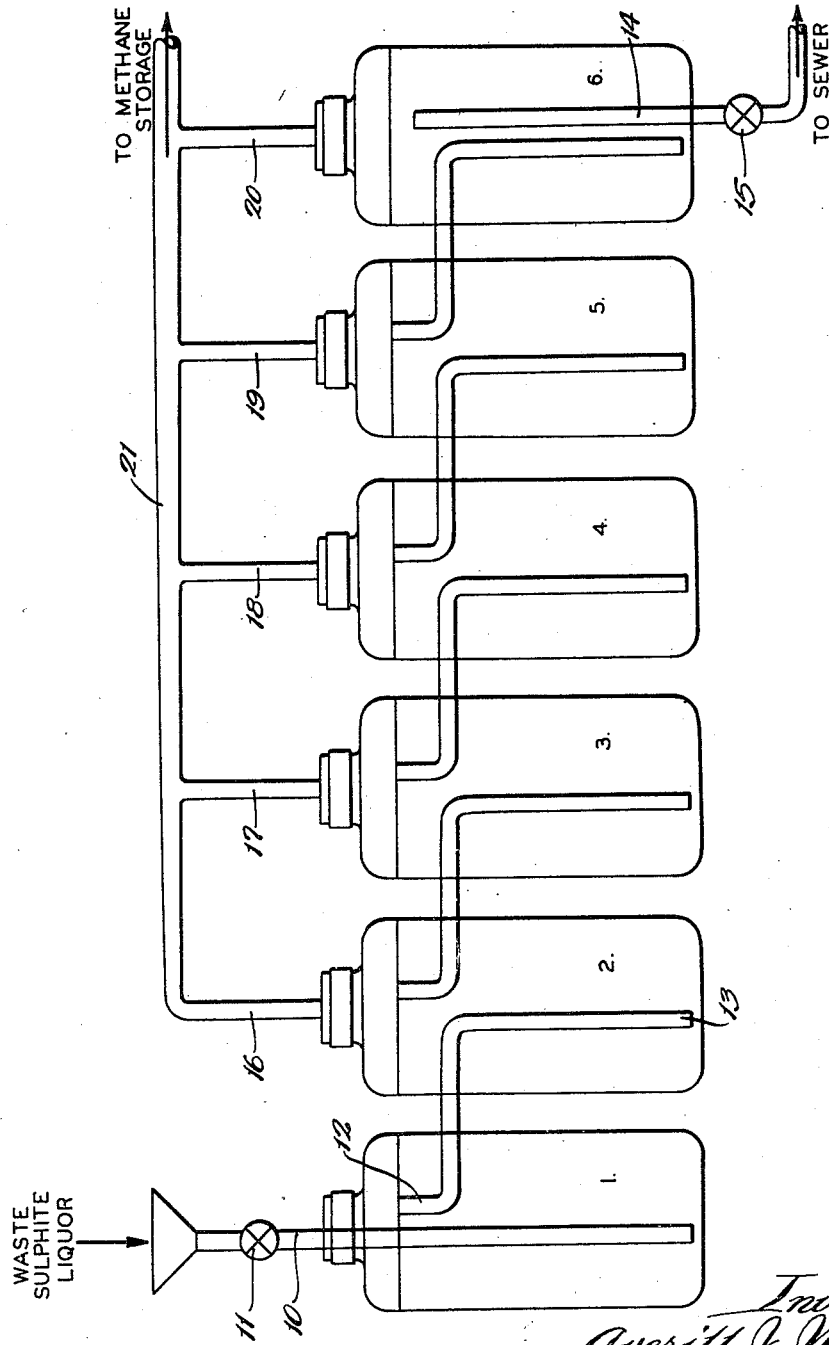

2,429,589

UNITED STATES PATENT OFFICE 2,429,589

MANUFACTURE OF FUEL GAS FROM PULP MILL WASTES

Averill J. Wiley, Appleton, Wis.

Application January 29, 1944, Serial No. 520,369

3 Claims. (Cl. 195—33)

My invention relates to improvements in the manufacture of fuel gas from pulp mill wastes. Although susceptible to many applications, the invention is of especial value in connection with the production of a gas containing useful percentages of methane from the material which, in the paper making industry, is called sulphite waste liquor.

In this country, most of the pulp used for paper making, which is manufactured by a chemical process as distinguished from mechanical pulp, is made by the well-known sulphite process. In this process, there is produced as an end product a waste liquor containing nothing of commercial value for paper making purposes and which therefore is discarded. This waste liquor, when in small amounts, may be discharged into a relatively large flowing stream or river, but it contains a high percentage of organic material having a high biological oxygen demand, so that if large amounts of it be discharged into a stream, particularly in the summer time when the temperature is such as to cause a high rate of biological activity coupled with low gas-receptivity, the oxygen of the stream is rapidly exhausted, and, as a result, the fish in the river are deprived of oxygen, suffocate, and die.

Hence, various attempts have been made to reduce the biological oxygen demand of waste sulphite liquor before it is discharged into flowing streams or other bodies of water containing valuable fish or other organisms requiring oxygen to maintain life. However, so far as I am advised, none of the proposals or attempts or processes so far suggested or practiced have proved entirely feasible from a commercial standpoint.

The object of the invention herein described is to provide a process, for treating waste sulphite liquor, which will not only reduce the biological oxygen demand to a reasonably safe figure, but will also result in the production of commercial quantities of fuel gas consisting largely of methane and which can be marketed at a price which will approximate or even exceed the cost of the treatment.

I am aware that prior investigators have proposed subjecting organic wastes to a fermentation process, one of the end products of which is methane, but I am informed that all of such processes so far suggested have been too slow or inefficient to be commercially feasible.

*General method*

I have discovered that an extraordinary gain in efficiency and in production of the useful fuel gas, methane, can be effected by subjecting sulphite waste liquor to plural stage fermentation. The first stage is conducted under such conditions as to promote the growth of organisms which serve to convert the organic material into intermediate products while at the same time said organisms serve to develop and maintain the condition under which they themselves thrive to best advantage. The liquid containing the organic material which in the first stage has been broken down into the intermediate products is then conducted into a zone where it is acted upon by organisms of a different character which are highly effective to break down the intermediate compounds into end products including a large per cent of the valuable fuel gas, methane.

In order to reduce the biological oxygen demand of the sulphite waste liquor to a point where the discharge of the effluent into a stream will have no adverse effect upon the life of fish therein, I have found that certain conditions should be maintained for the purpose of obtaining maximum efficiency at a minimum treatment cost. For example, I have found it advisable to have a first stage of anaerobic fermentation in which a relatively high acid condition is maintained (for instance a pH of 3.5 to 4.5), because the organisms which are most effective to break down the raw waste sulphite liquor into intermediate compounds thrive to best advantage under somewhat acid conditions. On the other hand, I have found that the organisms which are most effective to break down the intermediate compounds into the final compounds such as methane, work most effectively under less acid conditions, for example, at a condition represented by a pH of between 5.5 and 7.5. The volatile acid concentration, although subject to considerable variation, may be stated generally as approximately 5,000 to 10,000 P. P. M. (calculated as acetic acid) in the first fermentation zone and from 4500 to 500 P. P. M. or less in the methane fermentation stage.

When sulphite waste liquor is treated in the process, its concentration may vary considerably. Good results have been obtained with liquor containing as low as 3% of solids, but it is obviously advantageous to feed a more concentrated material so as to reduce the volume of liquor to be treated. A liquor containing 8% of solids has been successfully handled.

In order to nourish the organisms, it may be advisable in certain instances to re-activate the substrate by feeding small amounts of such substances as ammonium salts or urea or domestic sewage. These materials may be used separately or in combination with apparently equal success. The amounts of these materials added can be readily ascertained for a given condition by starting out with a rather large excess and then gradually decreasing the amount until the minimum amount for the optimum result is determined.

Actual tests indicate that good results are obtained when such nutrient substances are present in amounts such that the fermenting substrate may have nitrogen available as ammonia nitrogen to the amount of 2 parts nitrogen for each 100 parts biochemical oxygen demand to be removed and 1 part available phosphorus for each 100 parts biochemical oxygen demand to be removed.

It has been found that good results are obtained when conducting both fermentations at a temperature of about 37° C. It seems to be quite important to maintain uniformity of temperature, although other temperatures, for example 20° C. to 40° C. in the mesophilic range and 45° C. to 60° C. in the thermophilic range, can be employed successfully in the methane fermentation stage, provided that uniformity of temperature is maintained.

In order to obtain a satisfactory yield of methane, while at the same time effecting a safe reduction in the biological oxygen demand of the effluent, it appears to be necessary to assign more time to the methane stage than to the acid stage of the process. In fact, in actual practice, I have obtained the most satisfactory commercial results by using a ratio of 1 to 5, that is to say, the acid stage occupies one-sixth of the time required for the entire fermentation process.

Various ways of separating the acid stage from the methane stage can be used. For example, I can introduce the liquid at the bottom end of an inclined tube which is filled with some suitable inert porous material, the flow of liquid being suitably controlled so that by the time the liquid flows from the upper end of the tube the biological oxygen demand is sufficiently reduced. However, in most commercial operations, it will be found to be more practical to use separate fermentation vats or tanks, and, instead of having the methane fermentation tank five times as large as the acid fermentation tank, the methane fermentation can be carried on in a plurality of tanks arranged in cascade relation, preferably five in number. In the latter case, the process is carried on more efficiently and in less time, because there is no intermingling of the relatively low pH liquor coming from the acid tank with the higher pH liquor in the later stages of the methane system.

*Specific example*

In the drawing, I have illustrated one form of apparatus by means of which the invention may be practiced efficiently. In said drawing, the figure is a somewhat diagrammatic view of an apparatus employing one tank for the acid stage and five tanks for the methane stage, all arranged in cascade relation.

Referring to said drawing, each of the tanks 1, 2, 3, 4, 5 and 6 are of the same type and shape, No. 1 tank being for the acid stage for fermentation while tanks 2, 3, 4, 5 and 6 are for the methane stage of fermentation. It will be understood, of course, that all fermentation is carried out in the absence of air, after the process is well under way.

The tank 1 is sealed except that through the seal at the top of the tank there is inserted a feed tube 10 which extends almost to the bottom of the tank, so that the substrate is fed into the bottom and travels upwardly to the exit. The feed may be controlled by a suitable adjustment valve 11 or by any other convenient means well known to those skilled in the art. In the tank 1, there is arranged an exit or overflow pipe 12 which is connected to a down-flow pipe 13 in tank 2. Said pipe 13 extends almost to the bottom of tank 2. Any gases that are formed in the tank 1 will be discharged into tank 2 automatically through the exit pipe 12 as they are formed in the acid stage tank 1. Similarly, when the feed through valve 11 has been established, there will be a gradual overflow of substrate from the top of tank 1 through pipe 12 and 13 into the bottom of tank 2.

Tanks 3, 4 and 5 are equipped and arranged in the same manner as tank 2, but the final methane stage tank 6, although equipped with an inflow pipe similar to the preceding methane fermentation tanks, has an outflow pipe which is at all times located below the level of liquid in tank 6, so that no gas flows out through the said final discharge pipe 14. The discharge through pipe 14 is controlled through a suitable valve 15 or any other means for maintaining a constant level in tank 6, and the effluent finally finds its way into the sewer.

Each of the methane fermentation tanks 2, 3, 4, 5 and 6 are provided with gas relief pipes 16, 17, 18, 19 and 20 all connected to a common manifold 21 which leads to a methane storage reservoir.

In using the apparatus above described, the waste sulphite liquor, which comes from the paper mill at a concentration represented by about 5 to 6% of solids, is fed into tank 1 through valve 11. At the beginning of the process, active fermentation is started by inoculation with an appropriate source of the methane producing organisms. Methane digester sludge or supernatant from municipal sewage plants is found to be an excellent inoculum. For example, in our test, good results were obtained by adding digester sludge to tanks 1 and 2 of the system in the proportion of about 1 volume of digester sludge to 10 volumes of digester capacity in said tanks 1 and 2.

When the system has reached equilibrium, it is found to obtain results which are satisfactory both from a commercial standpoint and from the standpoint of reducing the biological oxygen demand to a sufficiently low figure to be safe or innocuous, the entire process can be practiced in less than ten days. It is believed that, in the case of large scale operations where exact controls can be applied, the total time required for the fermentation in both stages should not require more than about 48 hours.

Nutrient materials may be added during the carrying on of the process in the form of raw or partially treated domestic sewage, nitrogenous industrial wastes, or commercial chemicals such as urea, ammonium sulfate, ammonium phosphate, calcium superphosphate, ammonia and phosphoric acid.

The best results seem to be obtained when the pH value in the acid fermentation stage in tank 1 is about 3.5 to 4.5. Under the same conditions, the pH in vat 2, the first methane stage tank, should be about 5.5 to 6. The pH rises as the liquid flows through the successive tanks 3, 4, 5 and 6, and at the top of tank 6, the final tank in the methane fermentation stage, the effluent liquid has a pH of between 6.5 and 7.5. Similarly, the volatile acid concentration in tank 1 should be between 5,000 to 9,000 P. P. M. (calculated as acetic acid), whereas in the methane stages the acid concentration will drop from a value of about 4500 P. P. M. in the first tank to less than 500 P. P. M. in tank No. 6.

I claim:

1. In a process for producing methane from liquids containing fermentable organic material while at the same time reducing the biological oxygen demand of the liquids, in which the process comprises anaerobic bacterial digestion of the liquids in a preliminary intermediate-forming zone and a later methane-forming zone; the improvement which comprises limiting the rate of feed of fresh liquid to the digesting liquid in the first zone to maintain volatile acid in the first zone at about 5,000 to 10,000 P. P. M. calculated as acetic acid and limiting the rate of feed of the digesting liquid passing from the first zone to the second zone to prevent the average volatile acid content in the second zone from rising above 4,500 P. P. M. calculated as acetic acid, the pH of the digesting liquid in the first zone being effective for promoting the growth of the bacteria used for converting the organic material into methane-producing intermediates and the pH of the digesting liquid in the second zone being effective for promoting the growth of the bacteria used for converting the intermediates into methane.

2. In a process for producing methane from waste sulphite liquor containing fermentable organic material while at the same time reducing the biological oxygen demand of the liquor, in which the process comprises anaerobic bacterial digestion of the liquor in a preliminary intermediate-forming zone and a later methane-forming zone; the improvement which comprises limiting the rate of feed of fresh liquor to the digesting liquor in the first zone to maintain volatile acid in the first zone at about 5,000 to 10,000 P. P. M. calculated as acetic acid and limiting the rate of feed of the digesting liquor passing from the first zone to the second zone to prevent the average volatile acid content in the second zone from rising above 4,500 P. P. M. calculated as acetic acid, the pH of the digesting liquor in the first zone being effective for promoting the growth of the bacteria used for converting the organic material into methane-producing intermediates and the pH of the digesting liquor in the second zone being effective for promoting the growth of the bacteria used for converting the intermediates into methane.

3. In a process for reducing the biological demand of waste sulphite liquor by anaerobic bacterial digestion by methane-producing bacteria, the improvement which comprises first passing the liquor undergoing treatment through a zone in which the pH is maintained at about 3.4 to 4.5 and then passing the treated liquor through a zone in which the pH is maintained at about 5.5 to 7.5.

AVERILL J. WILEY.

REFERENCES CITED

The following references are of record in the file of this patent:

UNITED STATES PATENTS

| Number | Name | Date |
| --- | --- | --- |
| 2,029,702 | Buswell et al. | Feb. 4, 1936 |
| 1,990,523 | Buswell et al. | Feb. 12, 1935 |

OTHER REFERENCES

Prescott and Dunn, Industrial Microbiology, McGraw-Hill Book Co., Inc., New York, 1940, pages 501–515.

Thayson and Bunker, The Microbiology of Cellulose, Hemicelluloses, Pectin and Gums. Oxford University Press, London, 1927, page 314. (Copy in Division 63.)

"Industrial Microbiology," Smyth et al., 1930, pages 195 to 199. (Copy in Division 63.)

Nelson, Jr., Agricultural Research, February 15, 1939, pages 273 and 280. (Copy in Division 63.)